US010895872B2

United States Patent
(12) United States Patent
Fishkin et al.

(10) Patent No.: US 10,895,872 B2
(45) Date of Patent: Jan. 19, 2021

(54) DETECTION OF TEMPERATURE SENSOR FAILURE IN TURBINE SYSTEMS

(71) Applicant: Siemens Aktiengesellschaft, Munich (DE)

(72) Inventors: Alexey Fishkin, Munich (DE); Anthony Latimer, Lincoln (GB); Adam Marsden, Lincoln (GB); Mikhail Roshchin, Munich (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 203 days.

(21) Appl. No.: 16/075,726

(22) PCT Filed: Jan. 18, 2017

(86) PCT No.: PCT/EP2017/050918
§ 371 (c)(1),
(2) Date: Aug. 6, 2018

(87) PCT Pub. No.: WO2017/137218
PCT Pub. Date: Aug. 17, 2017

(65) Prior Publication Data

US 2019/0041838 A1 Feb. 7, 2019

(30) Foreign Application Priority Data

Feb. 9, 2016 (EP) .................................... 16154818

(51) Int. Cl.
*G05B 23/02* (2006.01)
*G01K 7/22* (2006.01)
(Continued)

(52) U.S. Cl.
CPC ....... *G05B 23/0254* (2013.01); *F01D 21/003* (2013.01); *G01K 7/22* (2013.01);
(Continued)

(58) Field of Classification Search
CPC .......................... G01K 15/007; F05D 2270/80
See application file for complete search history.

(56) References Cited

U.S. PATENT DOCUMENTS

| | | | |
|---|---|---|---|
| 6,804,600 | B1 | 10/2004 | Uluyol et al. |
| 2006/0137436 | A1 | 6/2006 | Buck et al. |

(Continued)

FOREIGN PATENT DOCUMENTS

| | | | |
|---|---|---|---|
| CN | 1713447 | A | 12/2005 |
| CN | 101726416 | A | 6/2010 |

(Continued)

OTHER PUBLICATIONS

Nancy Hall; "Combustor—Burner", NASA, Glenn Research Center https://www.grc.nasa.gov/www/k-12/airplane/burner.html; 2015.

(Continued)

*Primary Examiner* — Matthew G Marini

(57) ABSTRACT

A method of detecting a temperature sensor failure in a turbine system, includes obtaining individual measurement values from each temperature sensor in a group of temperature sensors, calculating a characteristic value for each temperature sensor in the group based on the measurement values for the corresponding temperature sensor, selecting a first characteristic value among the calculated characteristic values, determining a first maximum value as the maximum of the characteristic values except for the first characteristic value, and determining that the temperature sensor corresponding to the first characteristic value is defective if the first characteristic value is larger than the first maximum value multiplied by a predetermined factor. A corresponding device, system, computer program and computer program product utilize the method.

18 Claims, 2 Drawing Sheets

100
Obtain measurement values for temperature sensors in group — 102
Calculate characteristic value for each temperature sensor — 104
Select first characteristic value — 106
108 — Determine maximum of non-selected characteristic values
110 — Selected char. value> k*max.? (Yes / No)
112 — Notify operator of sensor failure
114 — Have all char. values been selected? (Yes / No)
118 — Select next char. value
116 — Done

(51) Int. Cl.
*G01K 15/00* (2006.01)
*G05B 9/02* (2006.01)
*F01D 21/00* (2006.01)

(52) U.S. Cl.
CPC ............. *G01K 15/007* (2013.01); *G05B 9/02* (2013.01); *F05D 2270/80* (2013.01); *G01K 2205/04* (2013.01)

(56) References Cited

U.S. PATENT DOCUMENTS

2009/0055070 A1* 2/2009 De ............................ F02C 9/00 701/100
2010/0089067 A1* 4/2010 Wilkes ............... G05B 23/0254 60/773
2013/0058373 A1 3/2013 Sakurada
2013/0064268 A1 3/2013 Foiret
2013/0110414 A1 5/2013 Caponetti et al.
2014/0341249 A1 11/2014 Kinoshita
2015/0184552 A1 7/2015 Tobo et al.
2015/0267591 A1* 9/2015 Miller ...................... G01K 3/06 60/273
2018/0266272 A1* 9/2018 Asti ...................... F01D 21/003
2019/0041838 A1* 2/2019 Fishkin .............. G05B 23/0254

FOREIGN PATENT DOCUMENTS

CN 102135453 A 7/2011
CN 102265017 A 11/2011
CN 103629049 A 3/2014
CN 104748319 A 7/2015
WO 2008004081 A2 1/2008

OTHER PUBLICATIONS

International Search Report dated Mar. 24, 2017, for PCT/EP2017/050918.
EP Search Report dated Jun. 24, 2016, for EP patent application No. 16154818.5.

* cited by examiner

100
Obtain measurement values for temperature sensors in group
102
Calculate characteristic value for each temperature sensor
104
Select first characteristic value
106
108
Determine maximum of non-selected characteristic values
110
Selected char. value> k*max.?
Yes
No
Select next char. value
118
112
Notify operator of sensor failure
114
Have all char. values been selected?
Yes
No
116
Done

DETECTION OF TEMPERATURE SENSOR FAILURE IN TURBINE SYSTEMS

CROSS REFERENCE TO RELATED APPLICATIONS

This application is the US National Stage of International Application No. PCT/EP2017/050918 filed Jan. 18, 2017, and claims the benefit thereof. The International Application claims the benefit of European Application No EP16154818 filed Feb. 9, 2016. All of the applications are incorporated by reference herein in their entirety.

FIELD OF INVENTION

The present invention relates to the field of monitoring and failure detection in turbine systems, in particular detection of temperature sensor failure in gas/steam turbine systems.

ART BACKGROUND

Any gas/steam turbine is instrumented with a large number of sensors which register a number of important physical parameters, e.g., burner tip temperatures and exhaust nozzle temperatures measured by thermocouples (temperature sensors). The registered parameter values are used by the turbine control system. Accordingly, it is very important that sensor failure is detected.

Using the turbine data, i.e., the parameter values and the events from the control system, a service engineer monitors the turbine performance. So, in handling a turbine trip (abnormal turbine shutdown), his primal task is to figure out the failure mode (e.g., thermocouple failure), then eliminate the root-cause (e.g., thermocouple repair) and start the turbine again as soon as possible (e.g., minimizing the outage hours).

The thermocouple failure is one of the most frequent failures. If there is a turbine trip (i.e., an abnormal turbine shutdown), the monitoring engineer always checks whether one of the thermocouples is broken. In order to determine a thermocouple failure, the engineer may proceed in two ways:

1. He can examine the graph of thermocouple temperatures to see whether there are some sudden jumps in the temperature. Since a typical turbine has 6-8 burner tip thermocouples and 12-18 exhaust nozzle thermocouples, this involves a substantial amount of work.

2. He can check the sequence of events from the control system written right before the turbine tip to see whether there is an event indicating “thermocouple failure”. However, the monitoring engineer is typically responsible for a number of turbines, such as 20 turbines or more. These turbines can be from different vendors, i.e., there may be different “event text” messages meaning the “thermocouple failure”. Furthermore, the control system may either not report the thermocouple failures in general or may not recognize any thermocouple failure.

So, in most turbine trip cases, the monitoring engineer simply browses the thermocouples data and manually examines the temperature graphs. Since the sensor data is written in short time intervals (such as 1 minute time intervals or even 1 second time intervals), this process can be very time consuming.

Thus, there is a need for a simple and fast way of detecting temperature sensor failures.

SUMMARY OF THE INVENTION

This need may be met by the subject matter according to the independent claims. Advantageous embodiments of the present invention are described by the dependent claims.

According to a first aspect of the invention there is provided a method of detecting a temperature sensor failure in a turbine system. The method comprises (a) obtaining individual measurement values from each temperature sensor in a group of temperature sensors, (b) calculating a characteristic value for each temperature sensor in the group based on the measurement values for the corresponding temperature sensor, (c) selecting a first characteristic value among the calculated characteristic values, (d) determining a first maximum value as the maximum of the characteristic values except for the first characteristic value, and (e) determining that the temperature sensor corresponding to the first characteristic value is defective if the first characteristic value is larger than the first maximum value multiplied by a predetermined factor.

This aspect of the invention is based on the idea that the measurement values from each temperature sensor in a group of temperature sensors is obtained and analyzed to determine if a characteristic value for one temperature sensor (i.e. the sensor corresponding to the selected first characteristic value) is significantly larger than the largest characteristic value of the other temperature sensors in the group, i.e. larger than the first maximum value multiplied by a predetermined factor. All temperature sensors belonging to the group of temperature sensors are arranged at similar positions within the turbine system and thus exposed to comparable environments. Accordingly, under normal conditions, it is expected that the characteristic values of all temperature sensors in the group are more or less equal. Therefore, if the selected characteristic value is significantly larger than the largest characteristic value of the other temperature sensors in the group, it is very likely that the selected temperature sensor is defective.

During operation of the turbine system, individual measurement values from each temperature sensor in the group of temperature sensors are obtained. That is, individual series of measurement values (e.g. with a predetermined sampling interval, such as 1 s, 2 s, 5 s, 10 s, 15 s, 20 s, 30 s, or 60 s) are obtained for each temperature sensor in the group. A characteristic value is calculated for each temperature sensor based on the measurement values from that temperature sensor. Now, to determine whether a particular temperature sensor is defective, the (first) characteristic value corresponding to that particular temperature sensor is selected and the (first) maximum value of all the other characteristic values is determined. If it turns out that the selected (first) characteristic value is larger than the (first) maximum value, it is determined that the temperature sensor is defective.

The method according to this aspect of the invention relies on measurement data that are already provided by any turbine system (for use in corresponding control systems) and can thus be carried out without the need for any additional measurement hardware or other modifications of the turbine system itself.

According to an embodiment of the invention, the method further comprises (a) selecting a second characteristic value among the calculated characteristic values, (b) determining a second maximum value as the maximum of the characteristic values except for the second characteristic value, and (c) determining that the temperature sensor corresponding to the second characteristic value is defective if the second characteristic value is larger than the second maximum value multiplied by the predetermined factor.

In this embodiment of the invention, a further (second) temperature sensor is selected for testing in a similar manner as described above. That is, the (second) characteristic value corresponding to another particular temperature sensor is selected and the (second) maximum value of all the other characteristic values is determined. If it turns out that the selected (second) characteristic value is larger than the (second) maximum value, it is determined that the further temperature sensor is defective.

Advantageously, all temperature sensors in the group are tested in this manner by sequentially selecting the corresponding characteristic value, calculating the maximum value of the non-selected characteristic values, and determining whether the selected characteristic value is larger than the maximum value multiplied with the predetermined factor.

According to a further embodiment of the invention, each characteristic value is calculated by applying a predetermined function, in particular a statistical function to the measurement values for the corresponding temperature sensor.

By applying a predetermined function to the measurement values, the characteristic value may be indicative for the behavior of the measurement values over time.

According to a further embodiment of the invention, the statistical function is selected from the group consisting of a standard deviation of the measurement values, an average of the measurement values, an exponential average of the measurement values, and an integral of the measurement values.

By calculating the standard deviation of the measurement values, the characteristic value is indicative of the degree of variation of the measurement values from the corresponding temperature sensor.

Likewise, the average, exponential average and (Riemann) integral of the measurement values characterize the behavior of the measurement values over time.

According to a further embodiment of the invention, the predetermined function is applied to the measurement values corresponding to a predetermined time period.

The predetermined time period may in particular constitute a so-called moving window in the sense that the method is performed at regular intervals (for example every minute or every 5 minutes) and that the last x minutes of measurement values preceding the time of performing the method are used.

According to a further embodiment of the invention, the duration of the predetermined time period is between 10 minutes and 30 minutes, such as between 15 minutes and 25 minutes, such as around 20 minutes.

Experiments have shown that a duration around 20 minutes provides a good trade-off between false alarms and false negatives.

According to a further embodiment of the invention, the predetermined factor is between 4 and 5.

Experiments have shown that a predetermined factor in this range provides robust and reliable detection of defective temperature sensors.

According to a further embodiment of the invention, the method further comprises (a) obtaining individual measurement values from each temperature sensor in a further group of temperature sensors, (b) calculating a characteristic value for each temperature sensor in the further group based on the measurement values for the corresponding temperature sensor, selecting a first characteristic value among the calculated characteristic values, (c) determining a first maximum value as the maximum of the characteristic values except for the first characteristic value, and (d) determining that the temperature sensor corresponding to the first characteristic value is defective if the first characteristic value is larger than the first maximum value multiplied by a predetermined factor.

In this embodiment, the measurement values from a further group of temperature sensors are processed in the same way as described above. It is important to note, that only the measurement values from temperature sensors in the further group are used to determine whether one of these sensors is defective.

According to a further embodiment of the invention, the temperature sensors of the group of temperature sensors are arranged to measure burner tip temperatures in the turbine system, and the temperature sensors of the further group of temperature sensors are arranged to measure exhaust nozzle temperatures in the turbine system.

According to a second aspect of the invention, a device for detecting a temperature sensor failure in a turbine system is provided. The device comprises (a) a unit for obtaining individual measurement values from each temperature sensor in a group of temperature sensors, (b) a unit for calculating a characteristic value for each temperature sensor in the group based on the measurement values for the corresponding temperature sensor, (c) a unit for selecting a first characteristic value among the calculated characteristic values, (d) a unit for determining a first maximum value as the maximum of the characteristic values except for the first characteristic value, and (e) a unit for determining that the temperature sensor corresponding to the first characteristic value is defective if the first characteristic value is larger than the first maximum value multiplied by a predetermined factor.

This aspect of the invention is based on the same idea as the first aspect described above and provides a device capable of performing the methods according to the first aspect and the above embodiments thereof.

According to a third aspect of the invention, there is provided a system for monitoring a plurality of turbine systems, each turbine system comprising at least one group of temperature sensors. The system comprises (a) a communication unit for receiving measurement values from the temperature sensors of each turbine system, (b) a storage unit for storing the received measurement, and (c) a processing unit for performing the method according to the first aspect or any of the above embodiments on the stored data for each turbine system.

This aspect of the invention is based on the idea that the simple method of detecting temperature sensor according to the first aspect may be used in a system for monitoring several turbine systems.

The measurement values from each of the turbine systems are received via a communication unit (e.g. a communication network) and stored in a storage unit for processing by a processing unit.

It is noted that the system according to this aspect of the invention may be implemented at a plant with several turbine systems or at a remote location. In both cases, it may collect measurement data from several plants.

According to an embodiment of the invention, the system further comprises (a) a notification unit transmitting a notification message to an operator of a turbine system if the processing unit has detected a temperature sensor failure in the turbine system.

In this embodiment of the invention, the notification unit transmits a notification message to the operator of the relevant turbine system in case of temperature sensor failure, such that the operator can take the necessary action.

Advantageously, the notification message may contain various information, such as a turbine ID, a temperature sensor ID, the time of detecting the error, etc.

According to a fourth aspect of the invention, there is provided a computer program comprising computer executable instructions, which, when executed by a computer, causes the computer to perform the steps of the method according to the first aspect or any of the above embodiments.

The computer program may be installed on a suitable computer system to enable performance of the methods described above.

According to a fifth aspect of the invention, there is provided a computer program product comprising a computer readable data carrier loaded with the computer program according to the fourth aspect.

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular to combinations of features of the method type claims and features of the apparatus type claims, is part of the disclosure of this document.

The aspects defined above and further aspects of the present invention are apparent from the examples of embodiments to be described hereinafter and are explained with reference to the examples of embodiments. The invention will be described in more detail hereinafter with reference to examples of embodiments. However, it is explicitly noted that the invention is not limited to the described exemplary embodiments.

DETAILED DESCRIPTION

Figure 1:
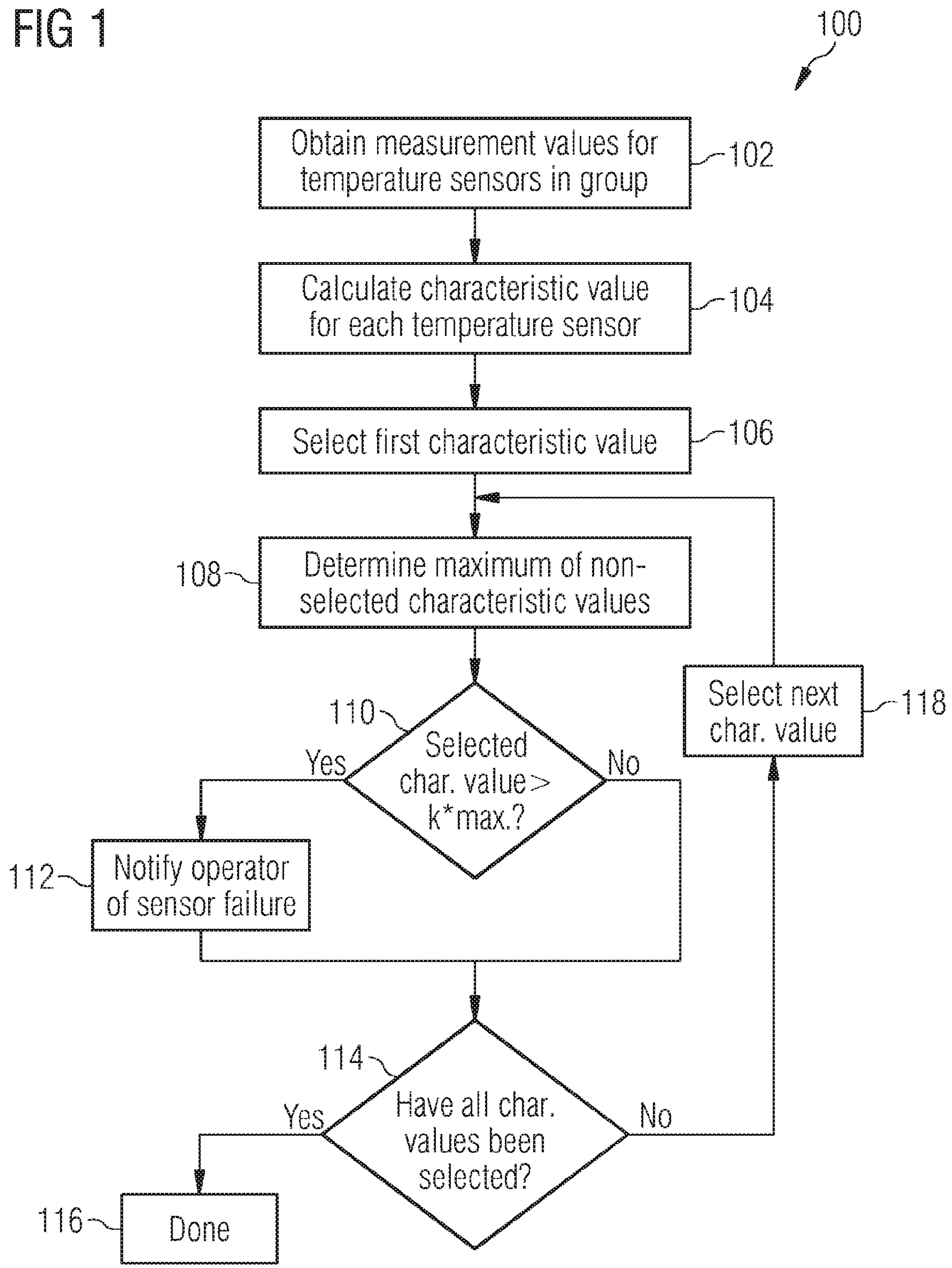
FIG. 1 shows a flowchart of a method according to an embodiment of the invention.

The illustration in the drawing is schematic. It is noted that in different figures, similar or identical elements are provided with the same reference numerals or with reference numerals which differ only within the first digit.

FIG. 1 shows a flowchart of a method 100 of detecting a temperature sensor failure in a turbine system according to an embodiment of the invention. More specifically, the turbine system, i.e. a gas/steam turbine, comprises a plurality of temperature sensors (thermocouples) arranged in groups within the turbine system, e.g. a group of burner tip temperature sensors and a group of exhaust nozzle temperature sensors.

The method 100 begins at step 102 where individual measurement values from each temperature sensor in one of the groups of temperature sensors are obtained. The measurement values from each single sensor within the group typically have the form of a series of measurement values (or samples) separated in time by a predetermined amount, such as 1 second or 1 minute.

At step 104, a characteristic value, advantageously a standard deviation, an average, an exponential average or an integral is calculated for each temperature sensor. In this regard, measurement values from the particular temperature sensor corresponding to a certain period of time, such as the last 20 minutes, are used.

At step 106, one of the calculated characteristic values is selected as a first characteristic value. This corresponds to selecting a first temperature sensor for testing.

At step 108, the maximum value among all other characteristic values (of the group) are determined. That is, the maximum value of the characteristic values except for the selected characteristic value is determined.

Now, at step 110, it is determined whether the selected characteristic value is larger than the maximum value multiplied with a predetermined factor between 4 and 5.

If this is the case, the temperature sensor corresponding to the selected characteristic value is deemed defective and the method proceeds to step 112, where measures are taken to notify the operator of the turbine system of the failure, e.g. by activating an alarm, sending a message, or in any other suitable manner. Thereafter, the method proceeds to step 114.

On the other hand, if the selected characteristic value is not larger than the maximum value multiplied with the predetermined factor, the temperature sensor is deemed to be working correctly and the method proceeds to step 114.

At step 114, it is checked whether all characteristic values have been selected, i.e. if all temperature sensors have been checked. As this was the first characteristic value, the answer is no and the method proceeds to step 118, where another characteristic value (next characteristic value) is selected. Thereafter, steps 108, 110, 112 (only if yes in step 110), and 114 are repeated for the selected next characteristic value.

When it is determined in step 114 that all temperature sensors have been tested, the method ends at step 116.

Advantageously, the method is repeated for another group of temperature sensors. Furthermore, the method may be repeated at a later stage as part of a continuous monitoring of the turbine system.

The core of the method 100 according to this embodiment is that it is determined whether a characteristic value that represents the variation in the measurement values during a predetermined period of time is significantly larger than the other characteristic values within the group of temperature sensors. Since the temperature sensors in one group are supposed to be exposed to comparable temperatures during steady state operation of the turbine, such determination implies that the particular sensor is behaving significantly different than the other comparable temperature sensors.

Figure 2:
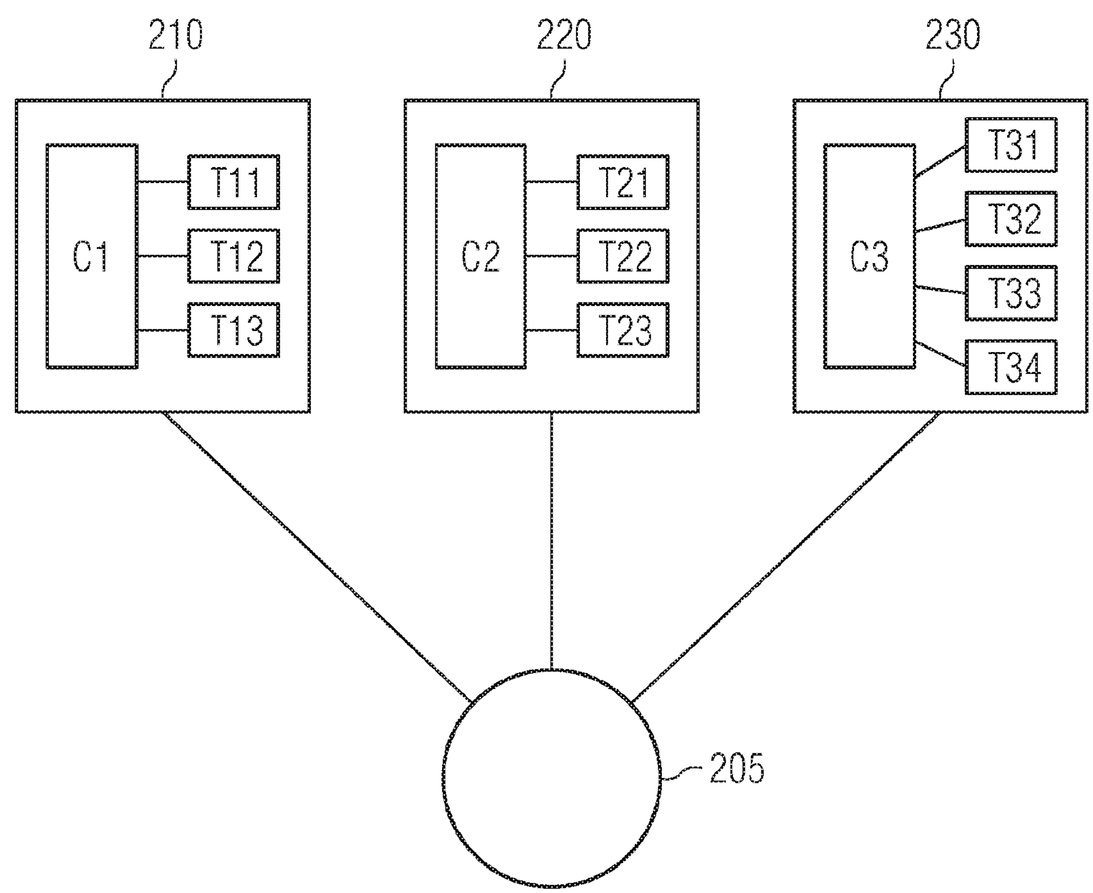
FIG. 2 shows a block diagram of a monitoring system according to an embodiment of the invention.

FIG. 2 shows a block diagram of a monitoring system according to an embodiment of the invention. The shown system comprises a monitoring device (or monitoring station) 205, a first turbine plant 210, a second turbine plant 220, and a third turbine plant 230. The first turbine plant comprises a controller C1 and three turbine systems T11, T12 and T13. The controller C1 is in communication with the turbines T11, T12 and T13 and receives measurement values from temperature sensors in each turbine T11, T12, T13 and transmits control signals to the turbines T11, T12 and T13. Similarly, the second turbine plant 220 comprises a controller C2 and three turbine systems T21, T22 and T23, and the third turbine plant 230 comprises a controller C3 and four turbine systems T31, T32, T33, and T34. As a general note, more turbine plants may be added and the number of turbine systems per plant may vary from what is shown in FIG. 2.

The device 205 is in communication with each of the turbine plants 210, 220 and 230 via a communication unit, such as a network interface, and receives the measurement values collected by the respective controllers C1, C2 and C3, advantageously in a continuous manner. The received measurement values are stored in a suitable storage unit and processed in accordance with the method described above in conjunction with FIG. 1. If the processing reveals a defective temperature sensor in one of the turbine systems T11, T12, T13, T21, T22, T23, T31, T32, T33, T34, a notification unit transmits a corresponding notification message to the operator of the relevant turbine plant 210, 220, 230, such that proper action can be taken, i.e. replacing the defective thermocouple.

Accordingly, the plant operator can rely on being notified in case of a defective temperature sensor in one of the plant turbines. Thereby, the cumbersome labor associated with the study of printed temperature curves or unreliable messages from the controllers C1, C2, C3 is no longer necessary.

It is noted that the term "comprising" does not exclude other elements or steps and the use of the articles "a" or "an" does not exclude a plurality. Also elements described in association with different embodiments may be combined. It is further noted that reference signs in the claims are not to be construed as limiting the scope of the claims.

LIST OF REFERENCE NUMERALS

100 Method
102 Method step
104 Method step
106 Method step
108 Method step
110 Method step
112 Method step
114 Method step
116 Method step
118 Method step
205 Monitoring device
210 Turbine plant
220 Turbine plant
230 Turbine plant

The invention claimed is:

1. A method of detecting a temperature sensor failure in a turbine system, the method comprising:
obtaining individual measurement values from each temperature sensor in a group of temperature sensors,
calculating a characteristic value for each temperature sensor in the group based on the measurement values obtained for the corresponding temperature sensor,
selecting a first temperature sensor of the group and an associated first characteristic value,
selecting a temperature sensor with a maximum characteristic value of the calculated characteristic values from a subgroup of temperature sensors that includes all of the temperature sensors of the group except the first temperature sensor,
determining a first maximum value as the maximum characteristic value, and
determining that the first temperature sensor is defective when the first characteristic value is larger than the first maximum value multiplied by a predetermined factor.

2. The method according to claim 1, further comprising:
selecting a second temperature sensor of the group that is different from the first temperature sensor and for which there is an associated second characteristic value,
selecting a temperature sensor with a maximum characteristic value of the calculated characteristic values from a subgroup of temperature sensors that includes all of the temperature sensors of the group except the second temperature sensor,
determining a second maximum value as the maximum characteristic value, and
determining that the second temperature sensor is defective when the second characteristic value is larger than the second maximum value multiplied by the predetermined factor.

3. The method according to claim 1,
wherein each characteristic value is calculated by applying a predetermined function to the measurement values for the corresponding temperature sensor.

4. The method according to claim 3,
wherein the predetermined function is selected from the group consisting of a standard deviation of the measurement values, an average of the measurement values, an exponential average of the measurement values, and an integral of the measurement values.

5. The method according to claim 3,
wherein the predetermined function is applied to the measurement values corresponding to a predetermined time period.

6. The method according to claim 5,
wherein a duration of the predetermined time period is between 10 minutes and 30 minutes.

7. The method according to claim 1,
wherein the predetermined factor is between 4 and 5.

8. The method according to claim 1, further comprising:
obtaining individual measurement values from each temperature sensor in a further group of temperature sensors,
calculating a characteristic value for each temperature sensor in the further group based on the measurement values obtained for the corresponding temperature sensor,
selecting a first temperature sensor of the further group and an associated first characteristic value of the first temperature sensor of the further group,
selecting a temperature sensor with a maximum characteristic value of the calculated characteristic values from a subgroup of temperature sensors that includes all of the temperature sensors of the further group except the first temperature sensor of the further group,
determining a first maximum value of the further group as the maximum characteristic value of the temperature sensors of the further group, and
determining that the first temperature sensor of the further group is defective if the first characteristic value of the first temperature sensor of the further group is larger than the first maximum value of the further group multiplied by a predetermined factor.

9. The method according to claim 8,
wherein the temperature sensors of the group of temperature sensors are arranged to measure burner tip temperatures in the turbine system, and wherein the temperature sensors of the further group of temperature sensors are arranged to measure exhaust nozzle temperatures in the turbine system.

10. A system for monitoring a plurality of turbine systems, each turbine system comprising at least one group of temperature sensors, the system for monitoring comprising:

a communication unit for receiving measurement values from the temperature sensors of each turbine system, a storage unit for storing the received measurement, and a processing unit for performing the method according to claim 1 on the stored data for each turbine system.

11. The system according to claim 10, further comprising:

a notification unit transmitting a notification message to an operator of a turbine system if the processing unit has detected a temperature sensor failure in the turbine system.

12. A non-transitory computer readable medium, comprising:

computer executable instructions stored thereon, which, when executed by a computer, causes the computer to perform the steps of the method according to claim 1.

13. A computer program product comprising:

a non-transitory computer readable data carrier loaded with computer executable instructions, which, when executed by a computer, causes the computer to perform the steps of the method according to claim 1.

14. The method according to claim 1, further comprising:

transmitting a notification to an operator of a turbine system if a processing unit has detected a temperature sensor failure in the turbine system.

15. The method according to claim 1, further comprising:

eliminating a root cause of the temperature sensor failure in the turbine system.

16. The method according to claim 1, further comprising:

replacing a defective thermocouple in the turbine system based on the detected temperature sensor failure.

17. The method according to claim 1, further comprising:

detecting an abnormal turbine shutdown;

eliminating a root cause of the temperature sensor failure in the turbine system; and restarting the turbine system after the abnormal turbine shutdown.

18. A device for detecting a temperature sensor failure in a turbine system, the device comprising:

a unit for obtaining individual measurement values from each temperature sensor in a group of temperature sensors, a unit for calculating a characteristic value for each temperature sensor in the group based on the measurement values obtained for the corresponding temperature sensor, a unit for selecting a first temperature sensor of the group and an associated first characteristic value, a unit for selecting a temperature sensor with a maximum characteristic value of the calculated characteristic values from a subgroup of temperature sensors that includes all of the temperature sensors of the group except the first temperature sensor, a unit for determining a first maximum value as the maximum characteristic value, and a unit for determining that the first temperature sensor is defective when the first characteristic value is larger than the first maximum value multiplied by a predetermined factor.

* * * * *